United States Patent
Pfister et al.

(10) Patent No.: US 10,970,070 B2
(45) Date of Patent: Apr. 6, 2021

(54) PROCESSING OF ITERATIVE OPERATION

(71) Applicant: Arm Limited, Cambridge (GB)

(72) Inventors: Nicholas Andrew Pfister, Austin, TX (US); Srinivas Vemuri, Austin, TX (US); David Raymond Lutz, Austin, TX (US)

(73) Assignee: Arm Limited, Cambridge (GB)

( * ) Notice: Subject to any disclaimer, the term of this patent is extended or adjusted under 35 U.S.C. 154(b) by 55 days.

(21) Appl. No.: 16/368,930

(22) Filed: Mar. 29, 2019

(65) Prior Publication Data
US 2020/0310796 A1    Oct. 1, 2020

(51) Int. Cl.
*G06F 9/30* (2018.01)
*G06F 7/483* (2006.01)

(52) U.S. Cl.
CPC ...... *G06F 9/30014* (2013.01); *G06F 9/30145* (2013.01); *G06F 7/483* (2013.01)

(58) Field of Classification Search
None
See application file for complete search history.

(56) References Cited

U.S. PATENT DOCUMENTS

| | | | | |
|---|---|---|---|---|
| 7,237,229 | B2* | 6/2007 | Ogawa | G06F 11/3624 712/227 |
| 8,291,197 | B2* | 10/2012 | Wu | G06F 9/3863 712/216 |
| 10,515,303 | B2* | 12/2019 | Lie | G06N 3/063 |
| 2014/0270162 | A1* | 9/2014 | Greiner | H04L 9/0662 380/46 |

* cited by examiner

*Primary Examiner* — Michael Sun
(74) *Attorney, Agent, or Firm* — Nixon & Vanderhye P.C.

(57) ABSTRACT

An apparatus has processing circuitry to perform, in response to decoding of an iterative-operation instruction by the instruction decoder, an iterative operation comprising at least two iterations of processing where one iteration depends on an operand generated in a previous iteration. Preliminary information generating circuitry performs a preliminary portion of processing for a given iteration to generate preliminary information. Result generating circuitry performs a remaining portion of processing for the given iteration, to generate a result value using the preliminary information. Forwarding circuitry forwards the result value as an operand for a next iteration of the iterative operation, for iterations other than the final iteration. The preliminary information generating circuitry starts performing the preliminary portion for the next iteration in parallel with the result generating circuitry completing the remaining portion for the current iteration, to improve performance.

16 Claims, 7 Drawing Sheets

PROCESSING OF ITERATIVE OPERATION

BACKGROUND

Technical Field

The present technique relates to the field of data processing.

Technical Background

A data processing apparatus, such as a microprocessor, may have an instruction decoder to decode program instructions, and processing circuitry to perform processing operations in response to the decoding of the program instructions. There can be a challenge in designing the processing circuit logic so that the operations for a given instruction can be completed within the timing constraints imposed by the clock frequency desired to be supported.

SUMMARY

At least some examples provide an apparatus comprising:
an instruction decoder to decode program instructions; and
processing circuitry to perform, in response to decoding of an iterative-operation instruction by the instruction decoder, an iterative operation comprising a plurality of iterations of processing, for which a subsequent iteration other than a first iteration is dependent on an operand generated in a previous iteration;
the processing circuitry comprising:
preliminary information generating circuitry to perform a preliminary portion of processing for a given iteration to generate preliminary information;
result generating circuitry to perform a remaining portion of processing for the given iteration, to generate a result value using the preliminary information determined by preliminary information generating circuitry; and
forwarding circuitry to forward the result value generated in the given iteration as an operand for a next iteration of the iterative operation, when the given iteration is an iteration other than a final iteration; in which:
when the result generating circuitry performs the remaining portion for the given iteration other than the final iteration, the preliminary information generating circuitry is configured to start performing the preliminary portion for the next iteration in parallel with the result generating circuitry completing the remaining portion for the current iteration.

At least some examples provide an apparatus comprising:
means for decoding program instructions; and
means for processing to perform, in response to decoding of an iterative-operation instruction by the instruction decoder, an iterative operation comprising a plurality of iterations of processing, for which an iteration other than a first iteration is dependent on an operand generated in a previous iteration;
the means for processing comprising:
means for generating preliminary information, by performing a preliminary portion of processing for a given iteration;
means for generating a result value using the preliminary information determined by preliminary information generating circuitry, by performing a remaining portion of processing for the given iteration; and
means for forwarding the result value generated in the given iteration as an operand for a next iteration of the iterative operation, when the given iteration is an iteration other than a final iteration; in which:
when the result generating circuitry performs the remaining portion for the given iteration other than the final iteration, the preliminary information generating circuitry is configured to start performing the preliminary portion for the next iteration in parallel with the result generating circuitry completing the remaining portion for the current iteration.

At least some examples provide a data processing method comprising:
decoding an iterative-operation instruction using an instruction decoder; and
in response to decoding of the iterative-operation instruction, performing an iterative operation comprising a plurality of iterations of processing, for which an iteration other than a first iteration is dependent on an operand generated in a previous iteration;
wherein the iterative operation is performed using processing circuitry comprising:
preliminary information generating circuitry to perform a preliminary portion of processing for a given iteration to generate preliminary information;
result generating circuitry to perform a remaining portion of processing for the given iteration, to generate a result value using the preliminary information determined by preliminary information generating circuitry; and
forwarding circuitry to forward the result value generated in the given iteration as an operand for a next iteration of the iterative operation, when the given iteration is an iteration other than a final iteration; in which:
when the result generating circuitry performs the remaining portion for the given iteration other than the final iteration, the preliminary information generating circuitry starts performing the preliminary portion for the next iteration in parallel with the result generating circuitry completing the remaining portion for the current iteration.

Further aspects, features and advantages of the present technique will be apparent from the following description of examples, which is to be read in conjunction with the accompanying drawings.

DESCRIPTION OF EXAMPLES

Processing circuitry may perform data processing operations in response to program instructions decoded by an instruction decoder. When designing the circuit logic for the processing circuitry, there may be a constant design challenge in balancing, on the one hand, a desire to support some relatively complex instructions which may require circuit logic of greater logic depth but which will therefore incur a greater processing delay when signals traverse the circuit logic, and on the other hand, a desire to increase clock frequencies as much as possible to provide improved performance. A relatively complex operation requiring a greater logic depth could be split across multiple processing cycles, but if a greater number of cycles is used then this may slow down the processing workloads which rely on that operation. This may be a particular problem for certain iterative-operation instructions which require two or more iterations of processing, because if each iteration has to be split over a greater number of cycles, then the corresponding performance hit is incurred multiple times for the same instruction. Another approach to dealing with the design challenge could be to reduce the maximum clock frequency supported to give more time for more complex operations to complete within a certain number of clock cycles, but in that case the reduced clock frequency will slow down performance for other types of operation which require less logic depth and could have completed in time at a faster clock frequency.

A technique is discussed below for improving per-iteration performance of an iterative-operation instruction which, when decoded by the instruction decoder, controls the processing circuitry to perform an iterative operation including two or more iterations of processing, for which a subsequent iteration other than a first iteration of the iterative operation is dependent on an operand generated in a previous iteration.

The processing circuitry includes preliminary information generating circuitry to generate preliminary information by performing a preliminary portion of processing for a given iteration of the iterative operation. Result generating circuitry performs a remaining portion of processing for the given iteration, to generate a result value using the preliminary information determined by the preliminary information generating circuitry. Forwarding circuitry forwards the result value generated in the given iteration as an operand for a next iteration of the iterative operation, when the given iteration is an iteration other than a final iteration of the iterative operation.

For an iterative operation where results of earlier iterations are forwarded for use in subsequent iterations, one would think that it is not possible to start the next iteration until the result of the preceding iteration has been generated. However, counter-intuitively, the inventors recognised that it is possible for the preliminary information generating circuitry to start performing the preliminary portion of processing for the next iteration in parallel with the result generating circuitry completing the remaining portion for the current iteration. This enables performance to be improved because the per-iteration latency may be less than the combined latency of the preliminary portion and remaining portion of processing, so that the iterative-operation instruction can be processed on processing circuitry supporting higher clock frequencies than would otherwise be possible. This provides a performance benefit not only for the iterative-operation instruction itself, but also for other instructions, because when a higher clock frequency is supported for the iterative-operation instruction then other instructions can also benefit from that higher clock frequency.

A latency between the preliminary information generating circuitry starting the preliminary portion for the given iteration and the preliminary information generating circuitries starting the preliminary portion for the next iteration may be less than a latency between the preliminary information generating circuitry starting the preliminary portion for the given iteration and the result generating circuitry completing the remaining portion for the given iteration. This means the processing circuitry is capable of operating in accordance with a clock signal having a clock period which is shorter than a combined latency of the preliminary portion and the remaining portion. The delay from starting the preliminary portion for the given iteration and starting the preliminary portion for the next iteration may correspond to N clock cycles, where N is 1 or more, but due to the overlapping of the preliminary portion for the next iteration with completion of the remaining portion of the current iteration, this means that the total processing (the combination of preliminary and remaining portions) for a given iteration actually has more than N cycles to complete, so that more aggressive scaling of clock frequencies is possible.

The preliminary information generating circuitry may perform the preliminary portion for the given iteration in an earlier clock cycle than a clock cycle in which the result generating circuitry starts performing the remaining portion for the given iteration. Hence, for the very first iteration performed for the iterative-operation instruction, the preliminary portion for that first iteration may be performed in a setup clock cycle, and then in the next clock cycle the remaining portion may be started for the given iteration, with the preliminary portion for the next iteration performed in parallel with the end of the remaining portion for the given iteration.

This technique could be applied to operations which require 2 or more clock cycles for the remaining portion of processing, i.e. for which N=2 or more in the example discussed above. However, it is particularly useful for operations for which the logic depth is slightly deeper than can fit into a single clock cycle, as this technique can then allow operations with too much logic for one cycle to nevertheless be processed with a delay scaling according to a single cycle per iteration, which can be extremely beneficial for performance. In particular, for implementations where N=1 (i.e. the preliminary portion for one iteration starts 1 cycle after the preliminary portion for the previous iteration), the total number of clock cycles taken to generate the result may be M+1 (1 setup cycle and M per-iteration result generating cycles), where M is the number of iterations in the iterative operation.

The preliminary portion of processing for a given iteration may comprise generating information on the operands to be processed in that iteration. For example, some initial processing of the operands may be needed to determine which logic paths within the result generating circuitry are needed, or to generate configuration signals for configuring certain logic elements of the result generating circuitry (such as determining a shift amount for a shifter, for example a partial or complete exponent difference for a significand alignment).

One may question why it could be possible for an iterative operation, which involves dependencies between iterations (and so requires forwarding of a result of one iteration as an operand for a next iteration), to be implemented with a preliminary portion of the next iteration performed in parallel with the end of the previous iteration. However, the inventors recognise there are several options which can enable parallelisation between iterations despite the forwarding of an operand for the next iteration based on the result of the previous iteration.

In one example, for a subsequent iteration other than the first iteration, the subsequent iteration could be dependent not only on a forwarded operand forwarded by the forwarding circuitry based on the result value from a previous iteration, but also on a second operand which is independent of the result of the previous iteration. In this case, the preliminary information determined by the preliminary information generating circuitry could comprise information derived from the second operand. As the second operand is independent of the result of the previous iteration, it can be available before the result of the previous iteration has been generated. The preliminary information generating circuitry could therefore start deriving information from the second operand before completion of the remaining portion of processing for the previous iteration, so that the logic depth for the remaining portion of processing can be shallower as it does not need to include logic for determining the preliminary information from the second operand.

Alternatively, or in addition to deriving preliminary information from a second independent operand, another approach could be that preliminary information could be information derived from early information on the forwarded operand which is available before the forwarded operand has fully been determined by the result generating circuitry for the previous iteration. For example, some partial information on the operand which will be forwarded to the next iteration could be available early, and hence some preliminary information could be derived from that early information for use in the next iteration of the iterative operation, in parallel with ongoing calculation of the full value of the forwarded operand in the previous iteration.

For example, the forwarded operand may be a floating-point operand having a sign, an exponent and a significand. Often, the sign and/or exponent of a floating-point result may be available earlier than then significand, as calculating the significand may require greater logic depth than calculating the exponent or sign. Hence, the early information returned about the forwarding operand could include information derived from at least one of the sign and the exponent of the forwarded operand. Preliminary information on the operand which will be processed in the next iteration could therefore be precomputed before the full forwarded operand including the significand has been calculated for the previous iteration, to speed up processing for the next iteration.

In cases where there is also a second operand which is independent at the result of the previous iteration, then the early information on the forwarded operand could be compared with information derived from the second operand to provide additional preliminary information. For example, an early-available exponent of the forwarded operand could be compared with the exponent of the second independent operand, to generate at least one bit of an exponent difference value, which could be useful for speeding up floating-point addition in the next iteration.

This technique can be particularly useful for iterative-operations for which the result value for a given iteration comprises a rounded floating-point value obtained by adding the floating-point operands. Floating-point additions can be relatively slow and require a relatively large logic depth because the addition of the floating-point operands may require some initial analysis of the exponents of the floating-point operands, alignment of the significands of the operand based on a difference between the exponents, addition of the aligned significands, and rounding to produce a rounded floating-point result. Hence, floating-point additions can often provide some of the tightest timing constraints when designing the processing logic for a given processor. In an iterative operation which requires a floating-point addition at each iteration, the technique discussed above can be very useful for speeding up the performance by reducing the per-iteration latency by overlapping part of the preliminary information computation with the remaining processing to generate the rounded floating-point value in a previous iteration.

For such an iterative operation involving floating-point additions, the preliminary information could comprise a variety of different types information about the floating-point operands to be added. For example the preliminary information could comprise any one or more of:
  an indication of whether one of the floating-point operands is subnormal;
  an indication of whether one of the floating-point operands is infinity;
  an indication of whether one of the floating-point operands is a Not-a-Number;
  at least part of an exponent difference value indicative of a difference between exponents of the floating-point operands;
  an indication of whether a fractional part of a significand of one of the floating-point operands is zero;
  an indication of whether the floating-point operands are like-signed operands or unlike-signed operands.

All of these types of information can be useful for controlling floating-point additions. By computing any of these types of information in parallel with the end of the previous iteration, this reduces the overall logic depth for the remaining portion and so improves performance by enabling higher clock frequencies.

While this technique could be used for any iterative operation involving floating-point additions, it can be particularly useful for a floating-point reduction operation. For such an operation, the iterative-operation instruction may identify a scalar floating-point operand and a vector data value comprising a number of data elements each specifying a floating-point operand. For such an instruction, each active iteration of the iterative operation may comprise addition of a first floating-point operand and a second floating-point operand. For a first active iteration of the active iteration, the first floating-point operand is the scalar floating-point operand and the second floating-point operand is the floating-point operand specified in a first active data element of the vector data value. For a subsequent active iteration of the active iteration, the first floating-point operand is a forwarding result of an addition in a preceding active iteration and the second floating-point operand is a floating-point operand specified in a subsequent active data element of the vector data value. Predicate information can be provided to specify which data elements of the vector data value are active data elements. Each iteration takes as its second floating-point operand a corresponding element of the vector, and if that vector is marked as active by the predicate information, this means the corresponding iteration is an active iteration, while an iteration for which the predicate information indicates that the corresponding data element of the vector is inactive is considered an inactive iteration. For inactive iterations, the flip-flops in the processing logic may have their enable signals deasserted to prevent them being updated based on inactive vector elements.

Processing systems may support vector operations, for which a number of lanes of processing, each lane using respective data elements of at least one vector operand, may be performed in response to a single instruction (this approach may also be referred to as single instruction multiple data or SIMD). Some SIMD implementations may provide hardware for processing multiple vector lanes in parallel, while other circuit implementations may perform at least some of the vector lanes sequentially or in blocks one after the other. Either way, use of vector processing can improve code density and improve performance by reducing the overhead in fetching and decoding instructions compared to equivalent scalar code which requires separate instructions for each lane of processing.

One use of such vector instructions can be to perform a number of lanes of floating-point processing which accumulate their results into respective elements of a vector, but eventually it may be desired to add together all of the elements in the vector to produce a scalar result, in which case the vector reduction operation discussed above can be useful. Including a scalar operand in the addition can be useful, because this means the vector reduction instruction can add all the elements of a vector operand into the scalar result obtained by a previous vector reduction instruction based on a different vector operand, so that by executing several vector reduction instructions in succession, the elements from multiple vectors may be accumulated together.

However, as floating-point additions are non-associative, it may be important that the addition of the respective vector elements are performed in a predefined order, to ensure that the result of adding the elements is predictable/repeatable. Hence, the iterations of adding each successive element of the vector to the scalar operand or the result of the earlier iteration may need to be performed sequentially. This means the performance on a single iteration can be important, because any slowing down of a single iteration would have a knock on effect of the overall instruction as its delay would be incurred multiple times. However, as each iteration involves a floating-point addition it can be a relatively slow operation compared to other types of processing operation and so the timing constraints may be relatively tight. The technique discussed above can be extremely useful for such vector reduction operations to allow less logic depth in one cycle because some preliminary information for the next cycle is computed in parallel with the result for the earlier cycle, to improve performance of the system as a whole and support higher clock frequencies.

One issue with such vector reduction operations is that for the first active iteration, the scalar floating-point operand is injected as the first floating-point operand, while for subsequent cycles the first floating-point operand is the forwarded operand forwarded from the result of a preceding active iteration. One would think that this would require a multiplexer to select when the scalar floating-point operand is injected as the first floating-point operand, and that this multiplexer should be provided on the forwarding loop signal path which supplies the forwarding result of the addition in the preceding active iteration as the first floating-point operand to be input for the subsequent active iteration. However, in practice a multiplexer may incur a relatively large logic depth and this added delay on the forwarding loop signal path may be enough to make it impractical to perform the single iteration of the vector reduction operation in a single cycle when clocked at certain higher clock frequencies.

Instead, as discussed further below, the multiplexer for selecting when the scalar floating-point is injected can be located outside the forwarding loop signal path which supplies the forwarded result of the addition in the preceding active iteration as the first floating-point operand for the subsequent active iteration. Hence, the forwarded result can simply be input to the next iteration without traversing a multiplexer, and the multiplexer is off the critical timing path through the forwarding loop. Instead, the forwarding loop signal path may comprise OR circuitry which supplies the first floating-point operand to be processed in a given iteration. This OR circuitry may combine a first input and a second input according to a bitwise OR operation. In iterations other than a first active iteration, the first input of the OR circuitry can be the forwarded result of the addition performed in the preceding active iteration. The second input may comprise the output of the multiplexer, which selects between the scalar operand, an all-zero value and optionally other values such as a forwarded result from the final iteration of a previous instance of executing the vector reduction (iterative-operation) instruction. As OR circuitry typically has much shallower logic depth than a multiplexer, this improves the performance, because the latency along the forwarding loop signal path is shorter, making it practical to perform a single cycle of the floating-point vector reduction operation at higher clock frequencies.

To enable the use of OR circuit logic instead of a multiplexer on the critical timing path, the result generating circuitry and the multiplexer itself may both ensure that in cycles where they are not intended to supply the value to be used as the first floating-point operand, they output a value of zero so that when ORed with the output from the other path then the OR result would be correct. Hence, in a final iteration of the iterative operation for a first iterative-operation instruction, the processing circuitry may supply an all-zero value on the forwarding loop signal path, to be used as the first input to the OR gate for a first active iteration for a subsequent iterative-operation instruction. On the other hand, the multiplexer may select the scalar floating-point operand (or a forwarded result from the final iteration of an earlier iterative-operation instruction) in the first active iteration for a given iterative-operation instruction and select an all-zero value in one or more subsequent active iterations. Hence, in each iteration either the output of the multiplexer or the output on the forwarding loop signal path is zero, and (unless the output of an active add iteration is a true zero returned by the forwarding circuitry) the other is non-zero (it is not possible for both outputs to be non-zero simultaneously). In this way, the presence of a multiplexer on the critical timing path can be avoided, replacing it with OR circuitry to improve performance and reduce latency.

Another way of avoiding the latency penalty of a multiplexer on the forwarding loop signal path can be to inject the scalar floating-point operand into the output of the forwarding circuitry during the set-up processing cycle, through a signal path which has a shorter logic depth than the logic depth through the result generating circuitry for generating the actual floating-point add result. Hence, during the set-up processing cycle, the output of the forwarding circuitry, which in subsequent cycles would provide a floating-point add result for a given iteration, can instead output the scalar floating-point operand, so that in the subsequent clock cycle the result generating circuitry may perform the remaining portion of processing using the scalar floating-point operand as the first floating-point operand for the first iteration of the loop. This approach can eliminate the OR circuitry as well as the multiplexer from the critical timing path of the forwarding loop.

Floating-Point Representation

Floating-point (FP) is a useful way of approximating real numbers using a small number of bits. The IEEE 754-2008 FP standard proposes multiple different formats for FP numbers, but some are binary 64 (also known as double precision, or DP), binary 32 (also known as single precision, or SP), and binary 16 (also known as half precision, or HP). The numbers 64, 32, and 16 refer to the number of bits required for each format.

FP numbers are quite similar to the "scientific notation" taught in science classes, where instead of negative two million we'd write $-2.0 \times 10^6$. The parts of this number are the sign (in this case negative), the significand (2.0), the base of the exponent (10), and the exponent (6). All of these parts have analogs in FP numbers, although there are differences, the most important of which is that the constituent parts are stored as binary numbers, and the base of the exponent is always 2.

More precisely, FP numbers consist of a sign bit, some number of biased exponent bits, and some number of fraction bits. Some FP formats of interest provide the following bits:

| format | sign | exponent | fraction | exponent bias |
|---|---|---|---|---|
| DP [63:0] | 63 | 62:52 (11 bits) | 51:0 (52 bits) | 1023 |
| SP [31:0] | 31 | 30:23 (8 bits) | 22:0 (23 bits) | 127 |
| HP [15:0] | 15 | 14:10 (5 bits) | 9:0 (10 bits) | 15 |

The sign is 1 for negative numbers and 0 for positive numbers. Every number, including zero, has a sign.

The exponent is biased, which means that the true exponent differs from the one stored in the number. For example, biased SP exponents are 8-bits long and range from 0 to 255. Exponents 0 and 255 are special cases, but all other exponents have bias 127, meaning that the true exponent is 127 less than the biased exponent. The smallest biased exponent is 1, which corresponds to a true exponent of −126. The maximum biased exponent is 254, which corresponds to a true exponent of 127. HP and DP exponents work the same way, with the biases indicated in the table above.

SP exponent 255 (or DP exponent 2047, or HP exponent 31) is reserved for infinities and special symbols called NaNs (not a number). Infinities (which can be positive or negative) have a zero fraction. Any number with exponent 255 and a nonzero fraction is a NaN. Infinity provides a saturation value, so it actually means something like "this computation resulted in a number that is bigger than what we can represent in this format." NaNs are returned for operations that are not mathematically defined on the real numbers, for example division by zero or taking the square root of a negative number.

Exponent zero, in any of the formats, is reserved for subnormal numbers and zeros. A normal number represents the value: $-1^{sign} \times 1.\text{fraction} \times 2^e$, where e is the true exponent computed from the biased exponent. The term 1.fraction is called the significand, and the 1 is not stored as part of the FP number, but is instead inferred from the exponent. All exponents except zero and the maximum exponent indicate a significand of the form 1.fraction. The exponent zero indicates a significand of the form 0.fraction, and a true exponent that is equal to 1-bias for the given format. Such a number is called subnormal (historically these numbers were referred to as denormal, but modern usage prefers the term subnormal). Numbers with both exponent and fraction equal to zero are zeros.

The following table has some example numbers in HP format. The entries are in binary, with "_" characters added to increase readability. Notice that the subnormal entry (4th line of the table, with zero exponent) produces a different significand than the normal entry in the preceding line.

| sign | 5-bit exponent | 10-bit fraction | 11-bit significand | value |
|---|---|---|---|---|
| 0 | 01111 | 00 0000 0000 | 100 0000 0000 | $1.0 \times 2^0$ |
| 1 | 01110 | 10 0000 0000 | 110 0000 0000 | $-1.1 \times 2^{-1}$ |
| 0 | 00001 | 10_0000_0000 | 110_0000_0000 | $1.1 \times 2^{-14}$ |
| 0 | 00000 | 10 0000 0000 | 010 0000 0000 | $0.1 \times 2^{-14}$ |
| 1 | 11111 | 00 0000 0000 | | −infinity |
| 0 | 11111 | 00_1111_0011 | | NaN |

A large part of the complexity of FP implementation is due to subnormals, therefore they are often handled by microcode or software. Processing circuitry which handles subnormals in hardware can speed up these operations by a factor of 10 to 100 compared to a software or microcode implementation.

Integers, Fixed-Point, Floating-Point

The FP way of handling signs is called sign-magnitude, and it is different from the usual way integers are stored in the computer (two's complement). In sign-magnitude representation, the positive and negative versions of the same number differ only in the sign bit. A 4-bit sign-magnitude integer, consisting of a sign bit and 3 significand bits, would represent plus and minus one as:

+1=0001
1=1001

In two's complement representation, an n-bit integer i is represented by the low order n bits of the binary n+1-bit value $2^n+i$, so a 4-bit two's complement integer would represent plus and minus one as:

+1=0001
1=1111

The two's complement format is practically universal for signed integers because it simplifies computer arithmetic.

A fixed-point number looks exactly like an integer, but actually represents a value that has a certain number of fractional bits. Sensor data is often in fixed-point format, and there is a great deal of fixed-point software that was written before the widespread adoption of FP. Fixed-point numbers are quite tedious to work with because a programmer has to keep track of the "binary point", i.e. the separator between the integer and fractional parts of the number, and also has to constantly shift the number to keep the bits in the correct place. FP numbers don't have this difficulty, so it is desirable to be able to convert between fixed-point numbers and FP numbers. Being able to do conversions also means that we can still use fixed-point software and data, but we are not limited to fixed-point when writing new software.

Rounding FP Numbers

Most FP operations are required by the IEEE-754 standard to be computed as if the operation were done with unbounded range and precision, and then rounded to fit into an FP number. If the computation exactly matches an FP number, then that value is always returned, but usually the computation results in a value that lies between two consecutive floating-point numbers. Rounding is the process of picking which of the two consecutive numbers should be returned.

There are a number of ways of rounding, called rounding modes; six of these are as follows:

| mode | | definition |
|---|---|---|
| RNE | round-to nearest, ties to even | pick the closest value, or if both values are equally close then pick the even value |
| RNA | round to nearest, ties to away | pick the closest value, or if both values are equally close then pick the value farthest away from zero |
| RZ | round to zero | pick the value closest to zero |
| RP | round to plus infinity | pick the value closest to plus infinity |
| RM | round to minus infinity | pick the value closest to minus infinity |
| RX | round to odd | pick the odd value |

The definition doesn't tell us how to round in any practical way. One common implementation is to do the operation, look at the truncated value (i.e. the value that fits into the FP format) as well as all of the remaining bits, and then adjust the truncated value if certain conditions hold. These computations are all based on:

L (least) the least significant bit of the truncated value

G (guard) the next most significant bit (i.e. the first bit not included in the truncation)

s (sticky) the logical OR of all remaining bits that are not part of the truncation.

Given these three values and the truncated value, we can compute the correctly rounded value according to the following table (Table 1):

TABLE 1

| mode | change to the truncated value |
|---|---|
| RNE | increment if (L&G)|(G&S) |
| RNA | increment if G |
| RZ | none |
| RP | increment if positive & (G | S) |
| RM | increment if negative & (G | S) |
| RX | set L if G | S |

For example, consider multiplying two 4-bit significands, and then rounding to a 4-bit significand.

sig1=1011 (decimal 11)

sig2=0111 (decimal 7)

multiplying yields sig1×sig2=1001101 (decimal 77) L Gss

The least significant bit of the truncated 4-bit result is labeled L, the next bit G, and s is the logical OR of the remaining bits labeled s (i.e. s=0|1=1). To round, we adjust our 4-bit result (1001) according to the rounding mode and the computation in the table above. So for instance in RNA rounding, G is set so we return 1001+1=1010. For RX rounding G|S is true so we set L to 1 (it's already 1, so in this case nothing changes) and return 1001.

EXAMPLES

Figure 1:
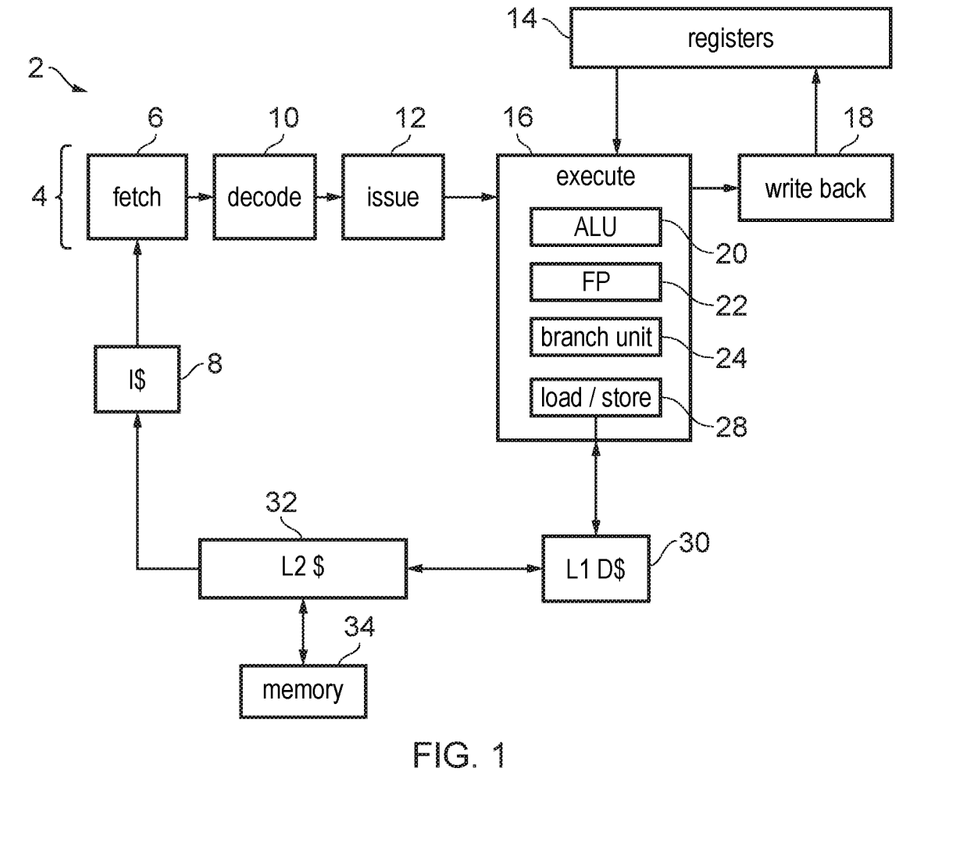
FIG. 1 schematically illustrates an example of a data processing apparatus.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetch program instructions to generate micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor an additional register renaming stage could be included for mapping architectural registers specified by program instructions or micro-operations to physical register specifiers identifying physical registers in the register file 14.

The execute stage 16 includes a number of processing units, for executing different classes of processing operation. For example the execution units may include a scalar arithmetic/logic unit (ALU) 20 for performing arithmetic or logical operations on scalar operands read from a scalar register file 21; a floating-point unit 22 for performing operations on floating-point values, a branch unit 24 for evaluating the outcome of branch operations and adjusting the program counter which represents the current point of execution accordingly; and a load/store unit 28 for performing load/store operations to access data in a memory system 8, 30, 32, 34. In this example the memory system include a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 28 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness, such as branch prediction mechanisms or address translation or memory management mechanisms.

The floating-point unit 22 supports processing operations performed on operands represented in a floating-point representation. The floating-point operations may include operations performed on scalar floating-point operands stored within scalar registers, or floating-point operands stored in respective data elements of a vector operand stored in a vector register. Some operations may also process both scalar and vector operands.

Figure 2:
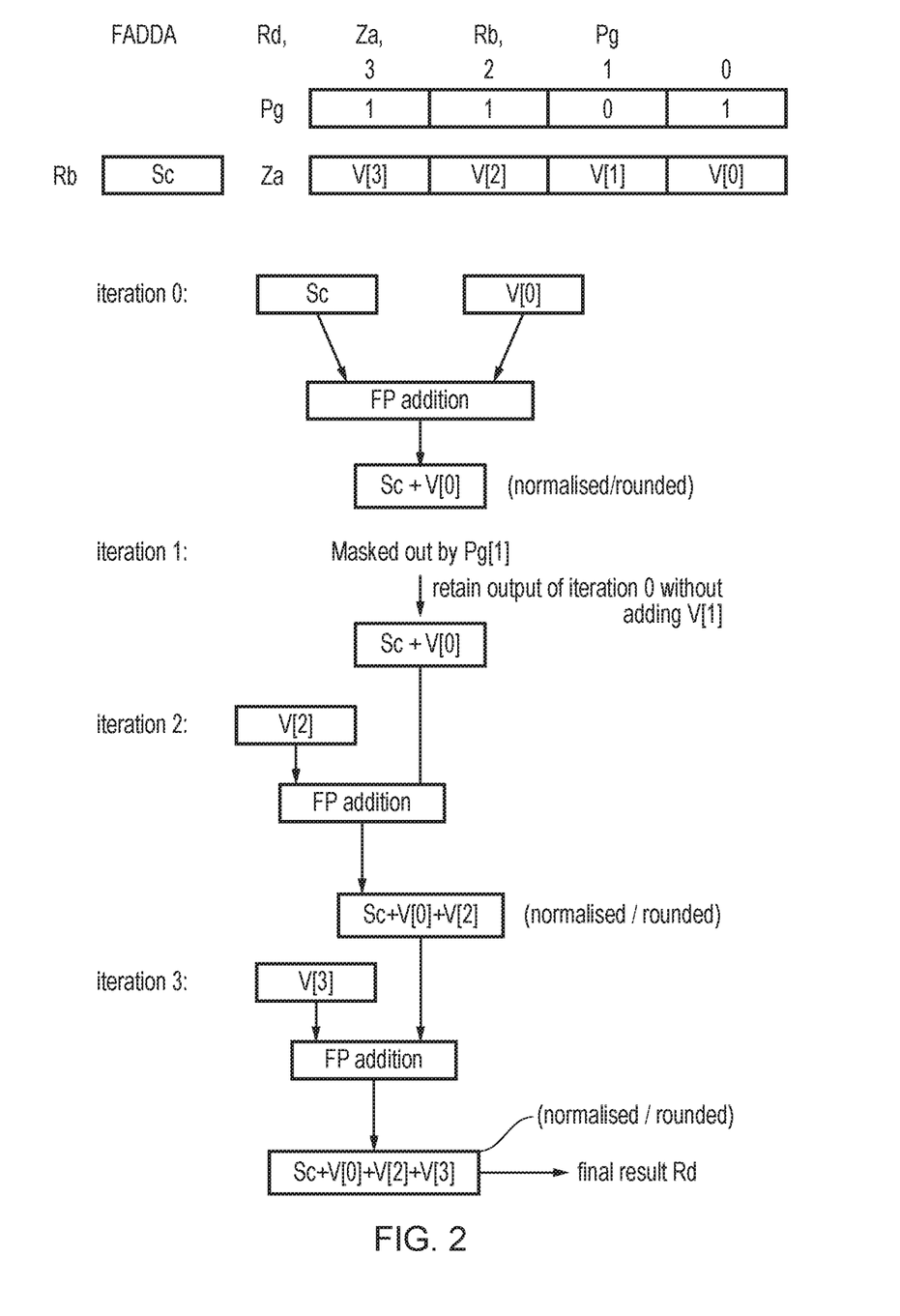
FIG. 2 shows an example of a floating-point reduction operation, which is an example of an iterative operation.

One type of floating-point operation which may be supported by the floating-point unit 22 may be a floating-point vector reduction operation, which may be controlled by a vector reduction instruction FADDA as shown in FIG. 2. The FADDA instruction is an example of an iterative-operation instruction as discussed above. The FADDA instruction specifies a scalar destination register Rd, a vector source register Za, a scalar source register Rb, and a predicate register Pg. The scalar source register Rb contains a scalar floating-point operand Sc which comprises a sign, a significand and an exponent as discussed above. Also, each element V of the vector source register Za also contains a floating-point operand, again comprising a sign, significand and exponent. The predicate register Pg contains a series of predicate indications which each indicate whether a corresponding element of the source vector register Za is active or inactive. In this example vector element V[1] is indicated as inactive because its corresponding predicate flag in position 1 of the predicate register is 0, and the other vector elements of Za are all active as their predicate flags are 1.

The lower part of FIG. 2 shows the operations to be performed for the FADDA instruction. In a first iteration, iteration 0, the scalar operand Sc in register Rb is added to the first active element V[0] in the vector register Za, using a floating-point addition including rounding and normalisation, to generate an iteration 0 result Sc+V[0]. In this example the next iteration (iteration 1) would normally add the result of iteration 0 to vector element V[1], but as V[1] element is inactive having been masked out by the predicate, the output of iteration 0 is retained as the output of iteration 1 without adding in the next vector element V[1]. For the subsequent iterations 2 and 3 shown in FIG. 2, the successive active elements V[2], V[3] of the vector are added one at a time to the result of the preceding iteration, again using floating-point addition including rounding and normalisation, until the final result is generated which in this example corresponds to the sum of the scalar operand Sc and the three active elements V[0], V[2] and V[3]. This final result is stored to the destination register Rd. In practice, it may be relatively common for several FADDA instructions to be executed in succession, with different source vectors as the vector register Za, and the destination register Rd for one FADDA instruction becoming the source scalar register Rb for the next instruction, to add vector elements across multiple vectors together.

As floating-point additions are non-associative, to give predictable results the iterations have to be done in the order corresponding to the order of the vector elements in the source vector, and cannot be parallelised, so that this type of operation is relatively sensitive to any added latency associated with performing the floating-point addition for a single iteration, as any added latency would be incurred multiple times, once per iteration. Hence, it may be desirable to provide techniques for reducing the latency per iteration for such an instruction.

Figure 3:
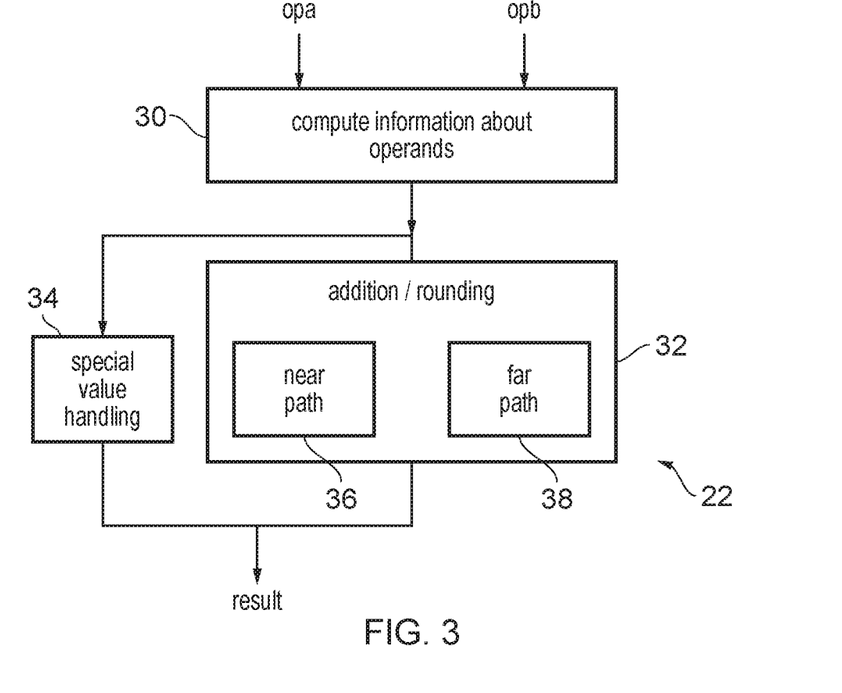
FIG. 3 shows an example of part of a floating-point add unit for adding two floating-point operands.

FIG. 3 shows for comparison, an example of processing logic which could be provided within the floating-point unit 22 for supporting this type of floating-point addition. FIG. 3 shows logic for a single iteration and for conciseness does not show the forwarding of operands back for another iteration. In general the addition may involve first computing information about the operands opa, opb to be added, using logic 30. For example an exponent difference between the exponents of the operands may be calculated, as well as information on whether the exponent/significand have certain special values which indicate that the floating-point operand is subnormal, infinity, NaN etc. as discussed above. The computed information can then be used for configuring how addition/rounding circuitry 32 or special value handling circuitry 34 processes the operands to generate the result.

The addition/rounding circuitry 32 may include near path logic 36 and far path logic 38 which handle different types of processing, depending on the computed information on the operands. A floating-point addition may be considered to represent either a like-signed-addition (LSA) or an unlike-signed-addition (USA). LSAs are performed when an add operation acts on two operands having the same value for the sign or when a subtract operation acts on values having different signs (these both effectively being additions), while USAs are add operations acting on floating-point operands with different signs or subtract operations acting upon operands with the same sign. The far path logic 38 may be designed to handle all LSAs and those USAs which act on operands whose exponents differ by more than 1. The far path logic 38 may include processing for aligning the significands of the operands based on the exponent difference, adding the aligned significands and rounding the result. On the other hand the near path logic 36 may handle USAs where the exponents are the same or differ only by 1, in which case logic may be required for adjusting the exponent based on the number of leading zeroes in the sum result, and for handling potentially subnormal outputs.

Hence, in general floating-point addition may require some information to be computed about the operands in order to decide how to process them, for example so that it can be selected whether the near-path 36 or the far-path 38 is needed, and for configuring other parts of the operation such as the shift amount required for alignment in the far-path 38, or for deciding whether the special value handling 34 of special floating-point values such as infinities or NaNs is required.

Figure 4:
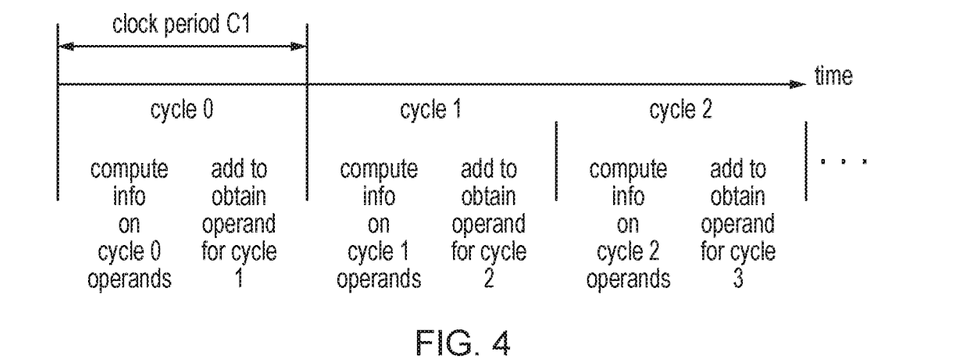
FIG. 4 shows an example timing diagram showing, for comparison, an approach where there is no overlap in processing of successive iterations of an iterative operation.

As shown in FIG. 4, if floating-point additions are included in an iterative operation such as the vector reduction operation of FIG. 2, then one would think that in each cycle of the iterative operation, it would be needed to first compute the information on the operands to be processed in that cycle, and then add the operands based on the computed information on the operands. The logic 30 for computing the information on the operands and then the subsequent addition circuitry 32 may both require a certain logic depth, so that the minimum clock period C1 (and hence the maximum clock frequency) which can be supported by the processing logic may be constrained based on the combined logic depth of the circuit logic 30, 32.

Figure 5:
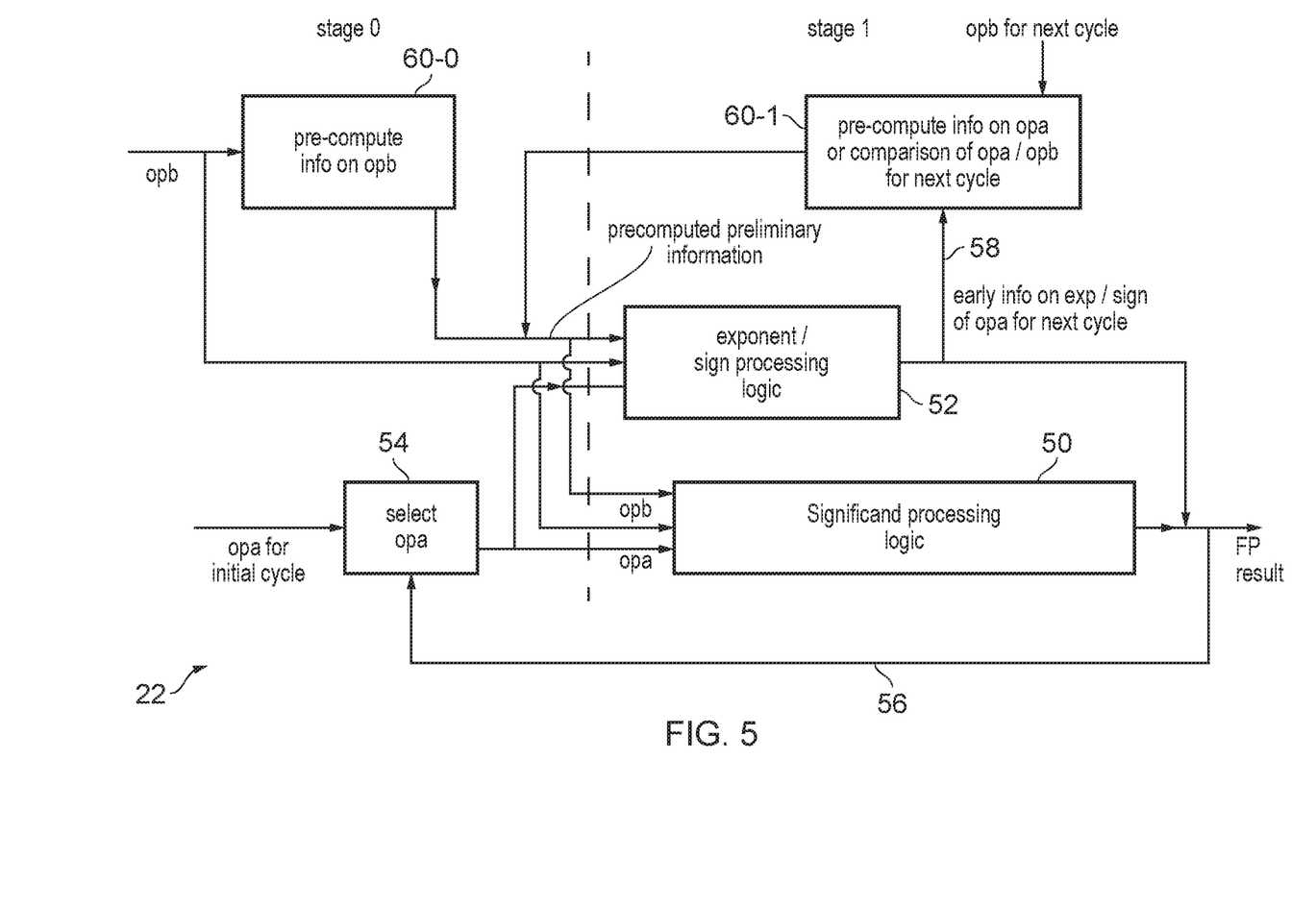
FIG. 5 shows a portion of the processing circuitry which supports an iterative operation, where a preliminary portion of processing for a given iteration can be performed in parallel with completion of a remaining portion for the previous iteration.

FIG. 5 shows an alternative approach. FIG. 5 shows part of the floating-point unit 22 for supporting processing of the floating-point vector reduction shown in FIG. 2. The floating-point vector reduction logic includes two stages, stage 0 and stage 1. Stage 1 includes most of the circuit logic for performing floating-point additions, e.g. the near/far path logic. For both the near path and far path logic (which are not distinguished in FIG. 5 for conciseness), the add circuit logic may include significand processing logic 50 which generates the significand of the result of adding two floating-point operands opa, opb and exponent and sign processing logic 52 which generates the exponent and sign of the result of adding the operands OPA, OPB. These are located in execution stage 1.

Selection circuitry 54 is provided to select which operand is supplied as the first floating-point operand opa to the significand processing logic 50 and the exponent/sign processing logic 52. In an initial cycle of the iterative floating-point reduction operation, the value from the scalar register Rb can be selected as operand opa, while in subsequent cycles the floating-point result from a previous iteration, which is forwarded on a forwarding path 56 of forwarding circuitry, may be used. On the other hand, the other operand opb may be selected from the respective vector elements of the source vector Za for the FADDA instruction.

As shown in FIG. 5, the floating-point unit includes preliminary information determining circuitry 60, which includes a portion 60-0 within stage 0 and a portion 60-1 within stage 1. The preliminary information generating circuitry 60 generates information on the operands opa, opb to be processed in the next iteration of the FADDA instruction, in parallel with the significand processing logic 50 completing generation of the addition result for a previous iteration. This exploits two properties of the FADDA instruction which mean that, despite one iteration of the iterative operation requiring a result generated in the preceding iteration, it is still possible to overlap processing of successive iterations so that they are performed partially in parallel. Firstly, as for the FADDA instruction the vector elements within the vector register Za are generally available from the start of processing the instruction, and do not depend on outputs of the addition in earlier cycles of the operation, then the stage 0 preliminary information generating circuitry 60-0 can precompute preliminary information on operand opb in parallel with the addition logic 50, 52 generating the forwarded operand opa to be used in the next cycle.

Also, in general the exponent and sign processing logic 52 may have a shorter logic depth than the significand processing logic 50. For example the significand processing logic 50 may require relatively slow operations such as shifts for alignment and carry-propagate additions, while the exponent and sign may be generated based on combinational logic or by selecting between the exponents or signs of the input operands, and so may be available earlier. Hence, some early information 58 on the exponent or sign of the value to be used as operand opa for the next iteration may be available before the full forwarded operand 56 is available. Hence, the stage 1 preliminary information generating circuitry 60-1 can precompute information on operand opa to be used in the next cycle before the full value of opa has been generated. Also, this stage 1 preliminary information generating 60-1 could precompute information (e.g. all or part of an exponent difference) based on the comparison of the early information on operand opa for the next iteration and the full value known for operand opb for the next iteration.

Figure 6:
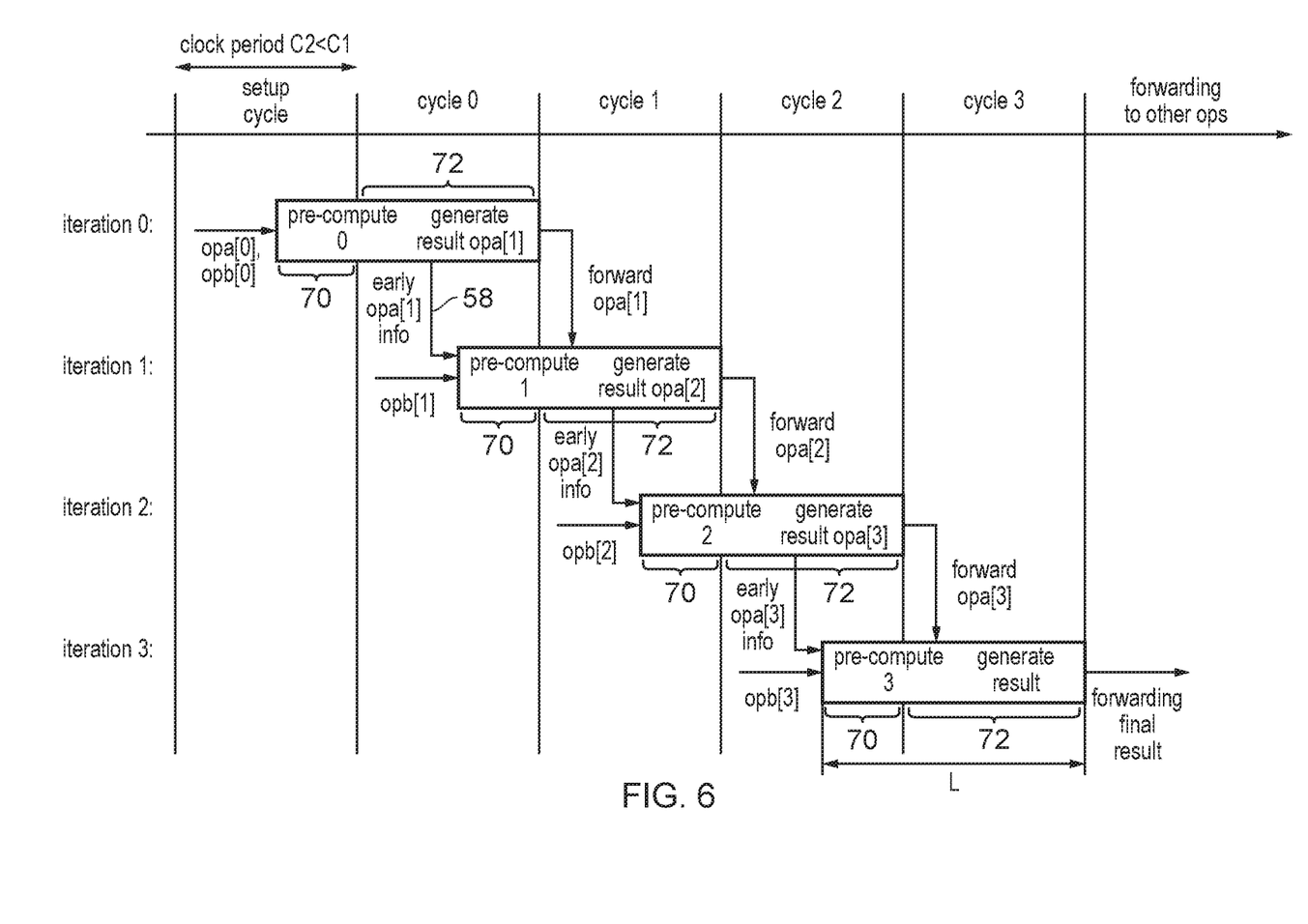
FIG. 6 shows a timing diagram showing an example of performing the iterative operation using the processing circuitry of FIG. 5.

By pulling some of the precomputation of information on the operands into an earlier cycle, this means the logic depth within the addition logic 50, 52 for the next cycle can be shorter, so that it is possible to use higher clock frequencies. FIG. 6 shows a timing diagram showing how this is possible. As shown in FIG. 6, in comparison to FIG. 4 the clock period C2 in FIG. 6 can be reduced relative to C1 in FIG. 4, because now a preliminary portion of processing 70 for generating preliminary information on the operands for a given iteration is overlapped with completion of a remaining portion 72 for generating the result of the preceding iteration.

Hence, in iteration 0, first a preliminary portion 70 of processing is performed within a setup clock cycle, to calculate preliminary information about the operands opa[0], opb[0] to be processed in iteration 0, and then in the next clock cycle (cycle 0), the result of processing the input operands opa[0], opb[0] is generated and this result is forwarded for use as operand opa[1] for iteration 1. Meanwhile, in parallel with the end of the remaining portion 72 of processing for iteration 0 which generates the result OPA[1], a preliminary portion 70 for iteration 1 is performed in clock cycle 0, based on the value of opb[1] known in advance and on the early information 58 returned on the exponent and sign of opa[1]. Similarly, for iterations 2 and 3 the preliminary portion 70 starts before the end of the remaining portion for the preceding iteration.

Hence, this means that the FADDA instruction can be supported on a system which uses a clock signal with a shorter clock period C2 than the combined latency L of the preliminary portion 70 and the subsequent portion 72 of a given iteration of the iterative operation. This enables more aggressive scaling of clock frequencies to improve performance not only for the FADDA instruction itself but also for all other instructions supported by the processing circuitry, as when the processing circuitry is clocked at a higher clock frequency then these other operations also speed up.

Figure 7:
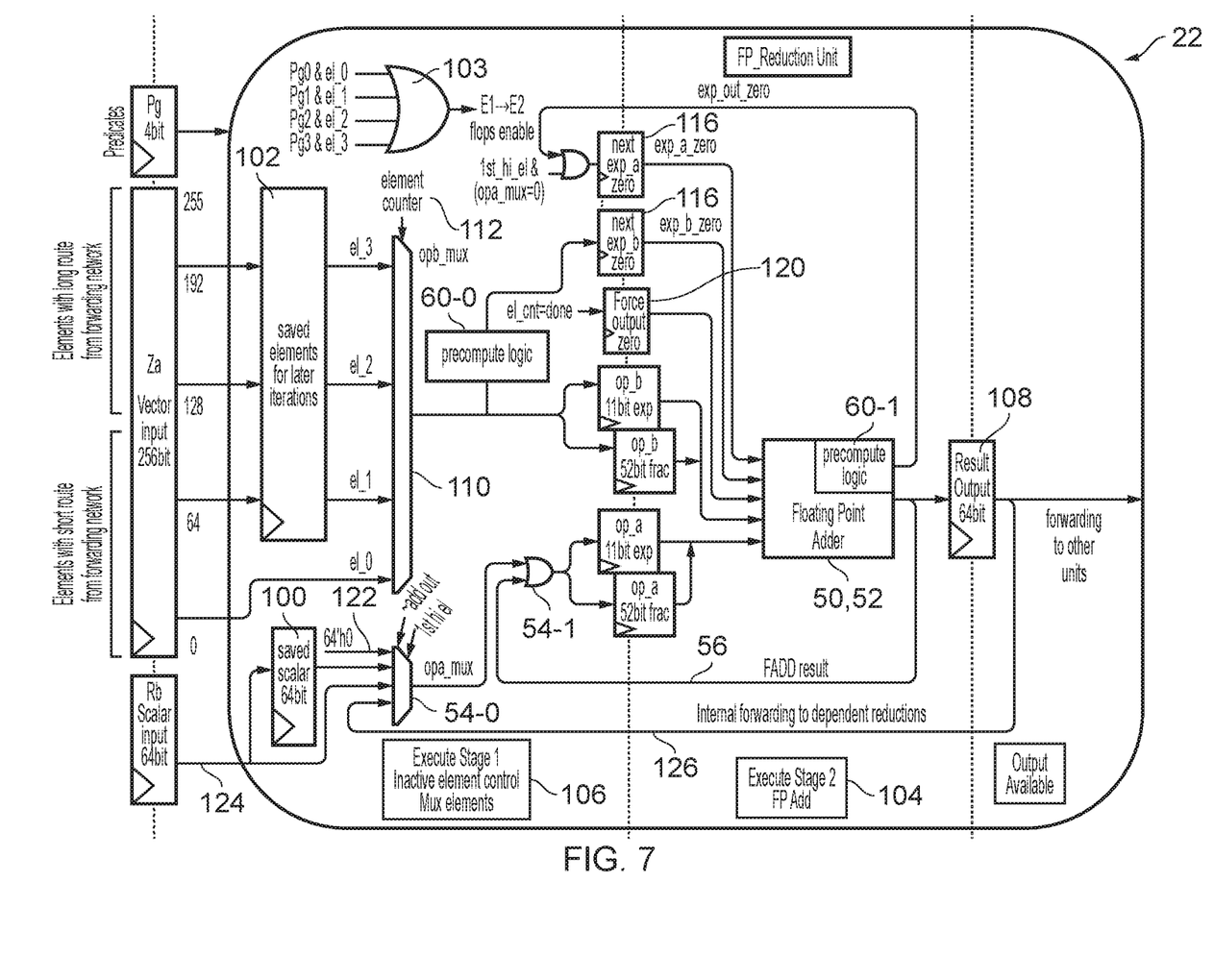
FIG. 7 shows a floating-point reduction unit for performing the floating-point reduction operation of FIG. 2.

FIG. 7 shows an example of a floating-point reduction unit, which can be provided within the floating-point unit 22 discussed above. As shown at the left hand side of FIG. 7, the floating-point reduction unit receives its input values from the scalar register Rb, vector source register Za, and predicate register Pg respectively, when executing a FADDA instruction as discussed above. The scalar operand from Rb is saved within internal register 100 of the floating-point reduction unit, and the vector elements el_1 to el_3 other than the first vector element el_0 are saved within internal registers 102 of the floating-point reduction unit, in case the corresponding source registers Rb, Za have been overwritten by the time these values are needed in a later clock cycle when performing later iterations of the FADDA operation. The internal register 100 for saving the scalar operand is provided because it is possible that the first active element of the vector could be one of elements el_1 to el_3 (if the predicate Pg marks el_0 as inactive), in which case the scalar value will be needed in a later iteration.

Enable logic 103 is provided to provide the enable signals which enable flip flops in the second execute stage 104 to be updated based on values from the first execute stage 106. In iteration X of the FADDA operation, if the predicate for element el_X indicates that element el_X is inactive, then the enable logic 103 deasserts the flip-flop enable signals, to ensure that an output flip-flop 108 of the second execute stage 104 retains its previous value and will not be updated, effectively providing the masking of an iteration as shown in the example of FIG. 2 for iteration 1. By preventing flops being updated this also saves power for the inactive iterations of the iterative operation. The first execute stage 106 includes a multiplexer 110 which selects which of the elements el_0 to el_3 of the input vector from register Za is supplied as operand opb in the current iteration. The multiplexer is controlled by an element counter 112 which cycles through the values 0, 1, 2, 3 to select the next element in each cycle. The other operand opa for the addition is selected by selection circuitry 54, which is implemented using a multiplexer 54-0 and an OR gate 54-1, which will be described in more detail below.

As in FIG. 5, the addition logic 50, 52 is provided in the second execute stage 104 and preliminary information generating circuitry 60 is provided including a portion 60-1 within the first stage 106 and a portion 60-1 in the second stage 104. In this example, the information computed by preliminary generating circuitry 60 in advance about the operands opa, opb for the next iteration includes an indication of whether the exponent of each operand opa, opb is 0, which is captured within flip flops 116. It is useful to pre-compute whether the exponents are 0, because this can allow early configuration of logic within the floating-point adder 50, 52. For example, this can allow determination of whether a floating-point operand is subnormal, which may require an adjustment of the exponent from 0 to 1 before being processed. By incurring the logic delay associated with determining whether the exponents are 0 for one iteration in parallel in computation with the floating-point result for the previous iteration, this reduces the latency within the second execute stage which makes it more practical to fit the logic depth for the floating-point adder 50, 52 within a single clock cycle.

FIG. 7 shows the forwarding path 56 which is used as forwarding circuitry to forward the floating-point result generated by the floating-point adder during one iteration back for input as operand opa in the next iteration. While one might think that this would need to be forwarded to a multiplexer in order to select between the forwarded result on the forwarding path 56 and the scalar input provided from register Rb, such a multiplexer can introduce a significant additional delay. Therefore, to speed up processing, instead the forwarding path 56 supplies its input to the OR gate 54-1, and the other input to the OR gate 54-1 is the output of the multiplexer 54-0. Hence, the OR gate 54-1 simply performs a bitwise OR of its two inputs, and supplies the result as the operand opa (including exponent and fraction) to the floating-point adder 50, 52. The OR gate has a much shorter logic delay than a multiplexer, so this improves performance.

As an OR gate is used, then if either input is non-zero, the non-zero bits in that input will affect the output of the OR gate 54-1. Therefore, to ensure that only one of the OR gate inputs is non-zero, either the loop forwarding path 56, or the output of the multiplexer 54-0 should always supply a value of 0. A flip-flop 120 is provided to provide a signal to the floating-pointer adder 60-1 which forces the value supplied on the forwarding path 56 to be cleared to 0 in the final iteration of processing for a given floating-point reduction instruction FADDA. Hence, this flip-flop 120 is asserted in clock cycles when the element counter 112 equals a value "done" which corresponds to the element position at the most significant end of the vector (e.g. "done"=3 for the 4-element example of FIG. 2). Hence, in the final iteration of performing one floating-point vector reduction instruction, the value on forwarding loop signal path 56 is output as all 0s, which means that when the floating-point reduction unit starts performing the iterative operation for a next floating-point vector reduction instruction, then on the first cycle of that next instruction the all-zero value on the loop forwarding path 56 will not interfere with the value output by multiplexer 54-0 which can then be selected based on the scalar value.

In any cycle other than the first active iteration of the iterative operation, the opa multiplexer 54-0 selects an all-zero value 122 to be supplied to the OR gate 54-1 so that it will not interfere with the forwarded result on the forwarding path 56 provided from the addition in the preceding iteration. In the first active iteration for a given floating-point vector reduction instruction, the opa multiplexer 54-0 selects one of: (i) the output 124 from the scalar source register Rb itself, (ii) the saved scalar operand stored in the internal register 100 of the floating-point reduction unit, and (iii) a floating-point operand provided on an instruction-to-instruction forwarding path 126 which provides the result 108 from one FADDA instruction as a potential input as the scalar operand from the next instruction, to avoid the delay of writing the result to a register and then reading it out again. Hence, the value on the internal instruction-to-instruction forwarding path 126 can be selected if forwarding between instructions is required. If no forwarding between instructions is required (because the preceding instruction being executed was not another floating-point vector reduction instruction, or because the destination register Rd of the preceding floating-point vector reduction instruction is different to the source register Rb of the current floating-point vector reduction instruction) then the value 124 from the original scalar register Rb is selected on the first iteration (corresponding to element el_0) if the first iteration is active, or the value from the internal register 100 is selected on the first active iteration if this is one of the subsequent iterations 1, 2, 3 other than iteration 0 because iteration 0 was marked as inactive by the predicate. Once a given active iteration has been processed then for any remaining iterations the opa multiplexer 54-0 selects the all-zero value 122 to avoid interfering with the iteration-to-iteration forwarding on loop signal path 56.

Hence, as the multiplexer 54-0 is outside the critical timing path along the loop 56, this improves performance and therefore enables more aggressive scaling of clock frequency.

FIG. 7 shows an example where the output of multiplexer 54-0 is passed through OR circuitry 54-1 which combines the forwarded operand from the forwarding path 56 with the scalar output of multiplexer 54-0. However, another approach is to inject the initial iteration's scalar value through a lightly logic loaded special path during the setup clock cycle to produce the scalar value on the output of the forwarding circuitry 56, which would remove the OR gate 54-1 from the single cycle forwarding return path 56 altogether, in addition to removing the multiplexer 54-0.

FIG. 7 shows an example of where the preliminary information computed on the operands for the next cycle is an indication of whether the exponent of either operand opa, opb is 0. This allows early construction of significands. Also, in FIG. 7 the exponent values may be returned earlier and the processing of the exponents by the floating-point adder 50, 52 can be skewed relative to the processing of significands for a given iteration, so the exponent processing starts ahead of the significand processing.

However, it is also possible for other preliminary information on the operands opa, opb for the next iteration to be determined in parallel with the completion of the remaining portion of processing for generating the floating-point addition result in the previous iteration. For example, it is possible to pre-compute a low-order bit or low-order set of bits of an exponent difference between the exponents of operands opa, opb, or even calculate the complete exponent difference expa-expb and/or expb-expa ahead of time. In some implementations, it may not be known in advance which of the operands have the larger exponent, so both exponent differences expa-expb and expb-expa may be calculated in parallel to allow early processing. Such exponent differences may be needed to determine the number of bit positions by which the smaller operand's significand should be shifted for alignment with the other significand, and can also be used for generating other information such as rounding status.

Also, the sign of the operands can be precomputed early, and this may control whether processing paths for handling LSAs or USAs are used, for example this may control the selection between the near and far processing logic as discussed above. Also, the precomputing logic 60 could compute information on whether a given floating-point operand is an infinity or NaN, which may control whether special handling logic for handling such special floating-point values is used.

Another example could precompute whether operand opb is equal to 0 (this may be determined if both the biased exponent and the fraction are 0), which could help speed up processing because more complex processing signal paths which involve additions could be omitted if it is already known that the operand was 0. If opb=0 for a given iteration, then the flip-flop enable signal for register 108 could be disabled to prevent the result of the previous iteration being updated, as the previous result +0 is still the previous result.

Hence, a wide range of information could be computed about the operands opa and/or opb, and by pulling this logic out of the critical path for a single iteration, this speeds the processing of that iteration and enables use of higher clock frequencies.

Figure 8:
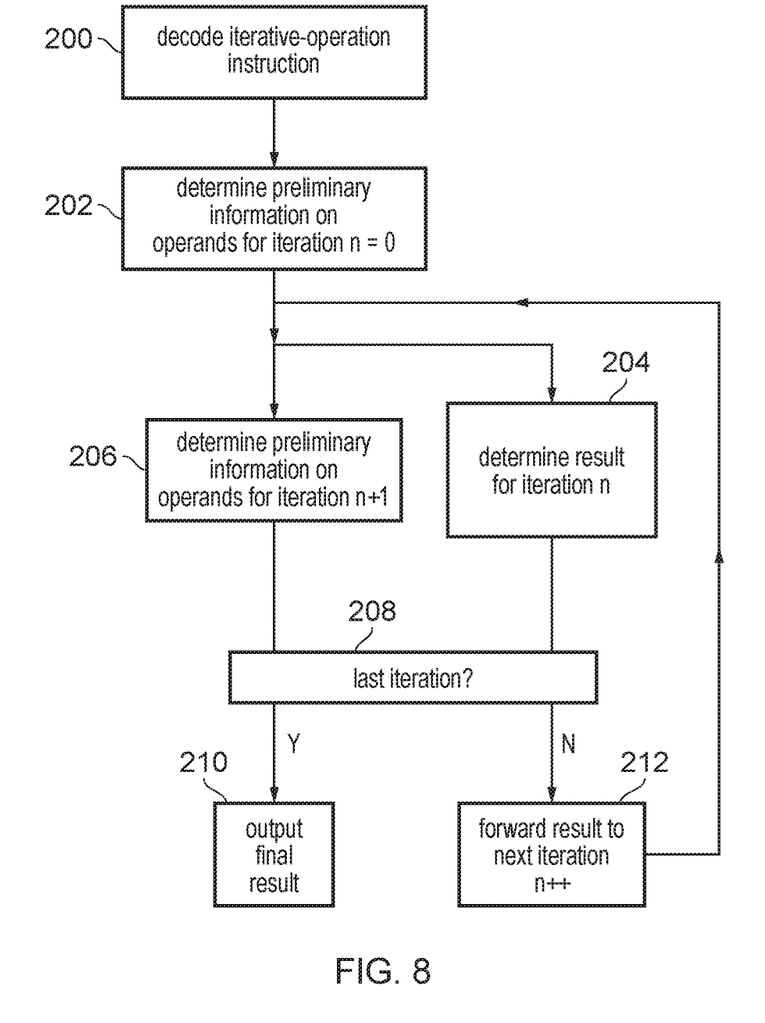
FIG. 8 is a flow diagram showing a method of performing an iterative operation.

FIG. 8 is a flow diagram illustrating a method of performing an iterative operation. At step 202, in a set up cycle, the preliminary information generating circuitry 60 determines preliminary information on the operands to be processed in iteration n of the iterative operation, where n=0 for the initial setup cycle.

In a subsequent clock cycle, at step 204 result generating circuitry 50, 52 generates the result value for iteration n, and in parallel with completion of the remaining portion of the iteration for generating that result, at step 206 the preliminary information generating circuitry 60 performs a preliminary portion of processing for the next iteration to determine preliminary information on the operands to be performed on the next iteration n+1.

At step 208 it is determined whether iteration n is the last iteration of the iterative operation, and if so then at step 210 the final result generated at step 204 for iteration n is output as the result of the instruction. However, if another iteration still remains to be processed, then at step 212 the forwarding circuitry 56 forwards the result for iteration n as an input for the next iteration n+1, and n is incremented. Hence, in the next clock cycle steps 204, 206 are performed again to perform the preliminary/remaining portions for the subsequent iterations n+2, n+1.

Hence, with this technique the latency associated with computing the preliminary information can be hidden in the shadow of the latency of determining the result, to improve performance.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
an instruction decoder to decode program instructions; and
processing circuitry to perform, in response to decoding of an iterative-operation instruction by the instruction decoder, an iterative operation comprising a plurality of iterations of processing, for which a subsequent iteration other than a first iteration is dependent on an operand generated in a previous iteration;
the processing circuitry comprising:
preliminary information generating circuitry to perform a preliminary portion of processing for a given iteration to generate preliminary information;
result generating circuitry to perform a remaining portion of processing for the given iteration, to generate a result value using the preliminary information determined by preliminary information generating circuitry; and
forwarding circuitry to forward the result value generated in the given iteration as an operand for a next iteration of the iterative operation, when the given iteration is an iteration other than a final iteration;

in which when the result generating circuitry performs the remaining portion for the given iteration other than the final iteration, the preliminary information generating circuitry is configured to start performing the preliminary portion for the next iteration in parallel with the result generating circuitry completing the remaining portion for the current iteration, and in which at least one of:
a latency between the preliminary information generating circuitry starting the preliminary portion for the given iteration and the preliminary information generating circuitry starting the preliminary portion for the next iteration is less than a latency between the preliminary information generating circuitry starting the preliminary portion for the given iteration and the result generating circuitry completing the remaining portion for the given iteration; and
the processing circuitry is capable of operating in accordance with a clock signal having a clock period shorter than a combined latency of the preliminary portion and the remaining portion.

2. The apparatus according to claim 1, in which the preliminary information generating circuitry is configured to perform the preliminary portion for the given iteration in an earlier clock cycle than a clock cycle in which the result generating circuitry starts performing the remaining portion for the given iteration.

3. The apparatus according to claim 1, in which the result generating circuitry is configured to perform the remaining portion for the given iteration in a single clock cycle.

4. The apparatus according to claim 1, in which the subsequent iteration other than the first iteration is dependent on:
a forwarded operand forwarded by the forwarding circuitry based on the result value from a previous iteration, and
a second operand independent of said result of the previous iteration.

5. The apparatus according to claim 4, in which said preliminary information comprises information derived from said second operand.

6. The apparatus according to claim 1, in which the subsequent iteration other than the first iteration is dependent on a forwarded operand forwarded by the forwarding circuitry based on the result value from a previous iteration, and said preliminary information comprises information derived from early information on said forwarded operand which is available before said forwarded operand is fully determined by the result generating circuitry for the previous iteration.

7. The apparatus according to claim 6, in which said forwarded operand is a floating-point operand having a sign, an exponent and a significand; and
said early information comprises information derived from at least one of the sign and the exponent of the forwarded operand.

8. The apparatus according to claim 1, in which the iterative-operation instruction identifies a scalar floating-point operand and a vector data value comprising a plurality of data elements each specifying a floating-point operand;
each active iteration of the iterative operation comprises an addition of a first floating-point operand and a second floating-point operand;
for a first active iteration of the iterative operation, the first floating-point operand is the scalar floating-point operand and the second floating-point operand is a floating-point operand specified in a first active data element of the vector data value; and for a subsequent active iteration of the iterative operation, the first floating-point operand is a forwarded result of an addition in a preceding active iteration, and the second floating-point operand is a floating-point operand specified in a subsequent active data element of the vector data value.

9. The apparatus according to claim 8, in which the processing circuitry is configured to determine which iterations are active iterations based on predicate information specifying which data elements of the vector data value are active data elements.

10. The apparatus according to claim 8, in which the forwarding circuitry comprises a forwarding loop signal path to supply the forwarded result of the addition in the preceding active iteration as the first floating-point operand for the subsequent active iteration;

the apparatus comprises a multiplexer to select when the scalar floating-point operand is injected as the first floating-point operand;

said multiplexer is located outside said forwarding loop signal path.

11. The apparatus according to claim 10, in which said forwarding loop signal path comprises OR circuitry to supply the first floating-point operand to be processed in a given iteration;

the OR circuitry is configured to combine a first input and a second input according to a bitwise OR operation;

in iterations other than a first active iteration, said first input comprises the forwarded result of the addition performed by the result generating circuitry in the preceding active iteration; and the second input comprises an output of the multiplexer.

12. The apparatus according to claim 11, in which in a final iteration of the iterative operation for a first iterative-operation instruction, the processing circuitry is configured to supply an all-zero value on the forwarding loop signal path, to be used as the first input to the OR gate for a first active iteration for a subsequent iterative-operation instruction.

13. The apparatus according to claim 11, in which the multiplexer is configured to select the scalar floating-point operand or a forwarded result of an earlier iterative-operation instruction in the first active iteration and to select an all-zero value in one or more subsequent active iterations.

14. An apparatus comprising:
an instruction decoder to decode program instructions; and
processing circuitry to perform, in response to decoding of an iterative-operation instruction by the instruction decoder, an iterative operation comprising a plurality of iterations of processing, for which a subsequent iteration other than a first iteration is dependent on an operand generated in a previous iteration;
the processing circuitry comprising:
preliminary information generating circuitry to perform a preliminary portion of processing for a given iteration to generate preliminary information;
result generating circuitry to perform a remaining portion of processing for the given iteration, to generate a result value using the preliminary information determined by preliminary information generating circuitry; and
forwarding circuitry to forward the result value generated in the given iteration as an operand for a next iteration of the iterative operation, when the given iteration is an iteration other than a final iteration;

in which when the result generating circuitry performs the remaining portion for the given iteration other than the final iteration, the preliminary information generating circuitry is configured to start performing the preliminary portion for the next iteration in parallel with the result generating circuitry completing the remaining portion for the current iteration, and in which the result value for the given iteration comprises a rounded floating-point value obtained by adding floating-point operands.

15. The apparatus according to claim 14, in which said preliminary information comprises at least one of:
an indication of whether one of the floating-point operands is subnormal;
an indication of whether one of the floating-point operands is infinity;
an indication of whether one of the floating-point operands is a Not-a-Number;
at least part of an exponent difference value indicative of a difference between exponents of the floating-point operands;
an indication of whether a fractional part of a significand of one of the floating-point operands is zero;
an indication of whether the floating-point operands are like-signed operands or unlike-signed operands.

16. A data processing method comprising:
decoding an iterative-operation instruction using an instruction decoder; and
in response to decoding of the iterative-operation instruction, performing an iterative operation comprising a plurality of iterations of processing, for which an iteration other than a first iteration is dependent on an operand generated in a previous iteration;
wherein the iterative operation is performed using processing circuitry comprising:
preliminary information generating circuitry to perform a preliminary portion of processing for a given iteration to generate preliminary information;
result generating circuitry to perform a remaining portion of processing for the given iteration, to generate a result value using the preliminary information determined by preliminary information generating circuitry; and
forwarding circuitry to forward the result value generated in the given iteration as an operand for a next iteration of the iterative operation, when the given iteration is an iteration other than a final iteration;

in which when the result generating circuitry performs the remaining portion for the given iteration other than the final iteration, the preliminary information generating circuitry starts performing the preliminary portion for the next iteration in parallel with the result generating circuitry completing the remaining portion for the current iteration, and in which at least one of:
a latency between the preliminary information generating circuitry starting the preliminary portion for the given iteration and the preliminary information generating circuitry starting the preliminary portion for the next iteration is less than a latency between the preliminary information generating circuitry starting the preliminary portion for the given iteration and the result generating circuitry completing the remaining portion for the given iteration; and the processing circuitry is capable of operating in accordance with a clock signal having a clock period shorter than a combined latency of the preliminary portion and the remaining portion.

* * * * *